United States Patent
Hung et al.

(10) Patent No.: US 9,641,015 B2
(45) Date of Patent: May 2, 2017

(54) CHARGING STRUCTURE

(71) Applicant: Winbond Electronics Corp., Taichung (TW)

(72) Inventors: Chung-Chih Hung, Tainan (TW); Yi-An Chen, New Taipei (TW)

(73) Assignee: Winbond Electronics Corp., Taichung (TW)

( * ) Notice: Subject to any disclaimer, the term of this patent is extended or adjusted under 35 U.S.C. 154(b) by 174 days.

(21) Appl. No.: 14/621,396

(22) Filed: Feb. 13, 2015

(65) Prior Publication Data

US 2016/0241049 A1    Aug. 18, 2016

(51) Int. Cl.
*H02J 7/00* (2006.01)

(52) U.S. Cl.
CPC .................... *H02J 7/0077* (2013.01)

(58) Field of Classification Search
USPC .................................................. 320/134, 136
See application file for complete search history.

(56) References Cited

U.S. PATENT DOCUMENTS

| | | | | |
|---|---|---|---|---|
| 6,031,359 A * | 2/2000 | Michelsen | ............ | H02J 7/0077 320/141 |
| 7,528,574 B1 | 5/2009 | Adkins et al. | | |
| 2001/0000212 A1* | 4/2001 | Reipur | ................ | G01R 31/3613 320/104 |
| 2008/0084189 A1* | 4/2008 | Kim | ........................ | G06F 1/263 320/160 |
| 2009/0102428 A1* | 4/2009 | Aradachi | ............... | H02J 7/0091 320/153 |
| 2010/0308774 A1* | 12/2010 | Park | ........................ | G06F 1/206 320/153 |
| 2012/0161717 A1* | 6/2012 | Li | ........................... | H02J 7/022 320/145 |

FOREIGN PATENT DOCUMENTS

| | | |
|---|---|---|
| TW | 201108559 | 3/2011 |
| TW | 201224486 | 6/2012 |
| TW | 201251270 | 12/2012 |
| TW | I395362 | 5/2013 |
| TW | M458527 | 8/2013 |
| WO | 2013124841 | 8/2013 |

OTHER PUBLICATIONS

"Office Action of Taiwan Counterpart Application", issued on Oct. 5, 2015, p. 1-p. 4.

* cited by examiner

*Primary Examiner* — Samuel Berhanu
(74) *Attorney, Agent, or Firm* — Jianq Chyun IP Office

(57) ABSTRACT

A charging structure including a power supply device, a rechargeable battery and a charging management device is provided. The power supply device is configured to provide a system voltage. The charging management device is configured to switch a corresponding charging mode according to the voltage level of the positive end of the rechargeable battery. The charging management device stops charging action when a charging current for charging the rechargeable battery drops down to a pre-set current value.

9 Claims, 3 Drawing Sheets

CHARGING STRUCTURE

BACKGROUND

Field of the Invention

The invention generally relates to a charging structure, and in particular, to a charging structure with an analog smooth transition circuit (ASTC) and an end of charge (EOC) circuit.

Description of Related Art

In this green energy technology age, electronic products and environmental protection must be linked to each other, and the battery is no exception, so when charging the battery charger must follow this principle. Frequency of use of a battery is about 500 to 1000 times, the capacity of the battery will be less and less with the number of charge-discharge cycles increases. Furthermore, take the general linear Li-Ion charger as an example, due to the internal resistance of the battery, when the system switches between each modes, such as small current mode transfers to constant current (CC) mode, or constant current mode transfer to constant voltage (CV) mode, if we do not do a good job related to circuit switching mechanism, which may lead to oscillation phenomenon during the circuit switching, and thus damage to the charger and the battery.

Besides, after the battery is fully charged, if the chargers failed to timely close the charging operation, it will lead to the battery overcharging which may greatly reduce the battery life, if there is no protecting battery mechanism, it is easy to produce a great damage to the battery, on the one hand, the battery capacity is no longer as usual, on the other hand, the battery elimination rate may also increase, and the more eliminated battery may also cause problems, such as junk issues, or environmental pollution, etc.

SUMMARY

The invention provides a charge management device with an analog smooth transition circuit (ASTC) and an end of charge (EOC) circuit, on the one hand, it can make the overall charging structure to switch between various charging modes stably for preventing the oscillation effect on the circuit, on the other hand, it can instantly determine the charging state of the battery and stop charging, to ensure that the battery may not be overcharged.

The invention provides a charging structure including a power supply device, a rechargeable battery and a charging management device. The power supply device is configured to provide system voltage. The charging management device is configured to switch a corresponding charging mode according to the voltage level of the positive end of the rechargeable battery. The charging management device stops charging action when the charging current for charging the rechargeable battery drops down to a pre-set current value.

In an embodiment of the invention, the charging management device includes a power switch, an analog smooth transition circuit (ASTC), and an end of charge (EOC) circuit. The power switch has a first end coupled to the system voltage, and a second end coupled to the positive end of the rechargeable battery to control an output end voltage for charging the rechargeable battery. The ASTC is coupled to a gate end of the power switch and is configured to regulate the voltage level of the gate end of the power switch according to the output end voltage. The EOC circuit is coupled to the second end of the power switch, which is configured to sense the charging current by a current sensing circuit. The EOC circuit stops the charging action when the charging current drops down to the pre-set current value.

In an embodiment of the invention, the ASTC includes a bias current source, a first current mirror, a second current mirror, a third current mirror, and a first transistor. The bias current source is configured to provide a bias current. The first current mirror is coupled to the bias current source to receive the bias current and provide a first current according to the bias current. The second current mirror is coupled to the first current mirror. The third current mirror is coupled to the first current mirror to regulate a first control current according to a first control bias. The first end of the first transistor is configured to receive the system voltage. The gate end of the first transistor is configured to receive a second control bias. The first transistor is configured to regulate a second control current according to the second control bias, wherein the total current of the first control current and the second control current is equal to the first current. The ASTC regulates a gate voltage level of the gate end of the power switch according to the total current.

In an embodiment of the invention, the EOC circuit includes a cut-off current source, a fourth current mirror, a fifth transistor, a fifth current mirror, a sixth current mirror, the second current sensing circuit, and a seventh current mirror. The cut-off current source is configured to provide a reference current. The fourth current mirror is configured to receive the reference current and provide a second current according to the reference current. The first end of the fifth transistor is coupled to the fourth current mirror. The gate end of the fifth transistor is coupled to a mode selecting circuit. The fifth transistor is configured to determine the conductive state of the path of the second current according to the level of a setting voltage. The fifth current mirror which is coupled to the second end of the fifth transistor is configured to receive the second current to generate a third current. The sixth current mirror is connected with the fifth current mirror in series and is configured to receive the third current. The second current sensing circuit is configured to sense the current level of the positive end of the rechargeable battery to generate a second sensing current. The seventh current mirror coupled to the second current sensing circuit is configured to receive the second sensing current and generate a fourth current according to the second sensing current. The EOC circuit determines the node voltage of a node between the sixth current mirror and the seventh current mirror according to the current difference between the third current and the fourth current.

In an embodiment of the invention, the EOC circuit includes an inverter. The input end of the inverter is coupled between the sixth current mirror and the seventh current mirror. The output end of the inverter is coupled to a sixth transistor. The inverter is configured to output an inverting result according to the node voltage of a node between the sixth current mirror and the seventh current mirror.

In an embodiment of the invention, the charging management device further includes a sixth transistor. The first end of the sixth transistor is coupled to the system voltage. The second end of the sixth transistor is coupled to the gate end of the power switch. The gate end of the sixth transistor is coupled to the EOC circuit. The sixth transistor determines the conductive state according to the inverting result.

Based on the above, the invention provides a charging structure having an ASTC and an EOC circuit, on the one hand, the invention with the smooth conversion circuit switches alternately between charging modes to achieve a continuous output voltage regulator function, so as to ease the output voltage level and improve the ripple voltage. On the other hand, the invention with the EOC circuit for fully rechargeable battery precisely and directly through the current sensing transistor to reduce the error in judgment, thereby it turns off the charging process more accurately. Therefore, the charging structure proposed by the invention may not damage the battery, but also lithium battery is fully charged precisely, therefore it significantly improves the charging quality and extends the battery life.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
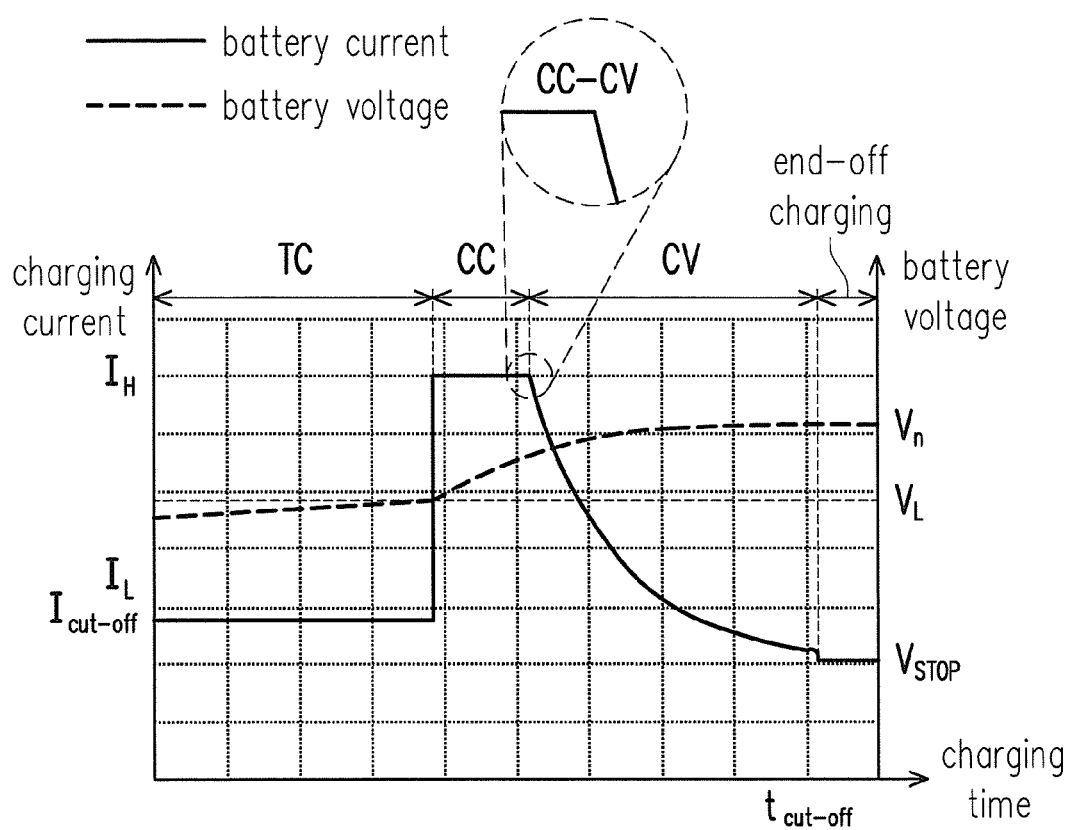
FIG. 1 is a waveform diagram illustrating a charging process of the charging management device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 3:
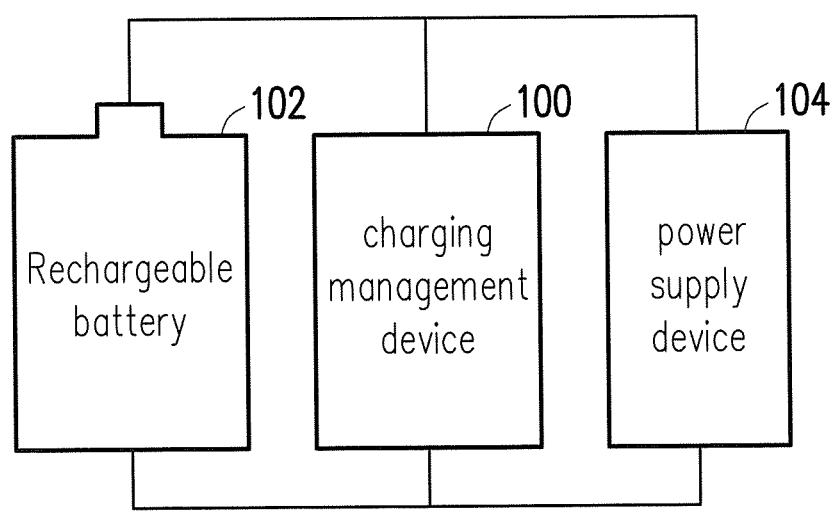
FIG. 3 is a block diagram illustrating a charging structure according to an embodiment of the invention.

First, FIG. 3 is a block diagram illustrating a charging structure according to an embodiment of the invention. Referring to FIG. 3, the charging structure 10 includes a power supply device 104, a charging management device 100, and a rechargeable battery 102. In the present embodiment, the power supply device 104 may be a charger, a mobile power, or a fuel cell battery module, etc. with at least a power output function, but the invention is not limited thereto. Besides, the charging management device 100 and the rechargeable battery 102 may be disposed in different types of the terminal device, such as an electric car or handheld device (for example, a Smart phone, a tablet, etc.), but the invention is not limited thereto.

In the present embodiment, when the rechargeable battery is connected to the power supply device 104, the charging management device 100 may regulate the corresponding charging mode according to the voltage level of the positive end of the rechargeable battery. When the charging current, which is configured to charge the rechargeable battery 102, falls below a pre-set current value, the charging management device 100 may terminate the charging operation. In the embodiment, the rechargeable battery is a lithium battery, but the invention is not limited thereto.

FIG. 1 is a waveform diagram illustrating a charging process of the charging management device according to an embodiment of the invention. Refer also to FIG. 1 and FIG. 3, the general lithium batteries is now the most widely used method for charging which are used in the constant current (CC) charging mode and a constant voltage (CV) charging mode. In the present embodiment, the charging process of charging management device 100 for the rechargeable battery 102 may be divided into 4 charging mode, which are trickle charge (TC) mode, CC mode, CC-CV mode, CV mode, and end-of-charging (EOC) mode, wherein the dotted line curve represents the battery voltage, the right vertical axis represents the charging voltage, the solid-line curve represents the battery current, the left vertical axis represents the charging current, and the horizontal axis represents the charging time.

In TC mode, due to the rechargeable battery is over discharge and the battery voltage is low, the charging management device 100 may use small current for charging. When the battery voltage of the rechargeable battery 102 is up to the pre-set voltage level $V_L$, the charging management device 100 may change to the CC mode. It is noted that, due to the charging management device 100 initially charges the small current to the battery, which may avoid the temperature of the battery rising or cause battery damage for using the large current (or constant current) rechargeable battery so as to achieve the effect of charging safety. In the present embodiment, the conversion point located between the TC mode and CC mode is the pre-set voltage level $V_L$, and the voltage value of the rechargeable battery is between about 2.8V to 3.2V, but the invention is not limited thereto.

Next, in the CC mode, the charging management device 100 may use the constant current $I_H$ for constant current charging to the rechargeable battery. With the battery voltage of the rechargeable battery 102 gradually rises to the pre-set voltage $V_n$, and the constant current circuit (not illustrated) of the charging management device 100 may gradually lose effectiveness and be replaced with the constant voltage circuit (not illustrated) of the charging management device 100. In other words, in this case the charging current for charging the rechargeable battery 102 in the charging management device 100 is less and less with the battery voltage rising, and the charging management device 100 may enter into an CC-CV mixed mode, that is the transition point between the CC mode and the CV mode as shown in FIG. 1. In the embodiment, the pre-set voltage level $V_n$ is about 4.2V of the voltage value of the charging voltage, but the invention is not limited thereto.

Besides, it is noted that, in this case, the analog smooth transition circuit (not shown) in the charging management device 100 that employs an interleaving control, and switches back and forth on the state of CC mode and CV mode to stabilize the output voltage of the charging management device 100 (further described in the following after referring to FIG. 2) and also reduces the occurrence of the ripple voltage, so as to achieve a smooth transition effects. Then, the circuit is gradually entering into the CV mode, the output voltage may rise slowly, and the charging current decline rapidly. Finally, the charging current of the management device 100 for charging the rechargeable battery 102 is lower than the cut-off current value (e.g., $I_{cut-off}$), the management device 100 may be switched from the CV mode to the end-off charging mode (further described in the following after referring to FIG. 2).

Figure 2:
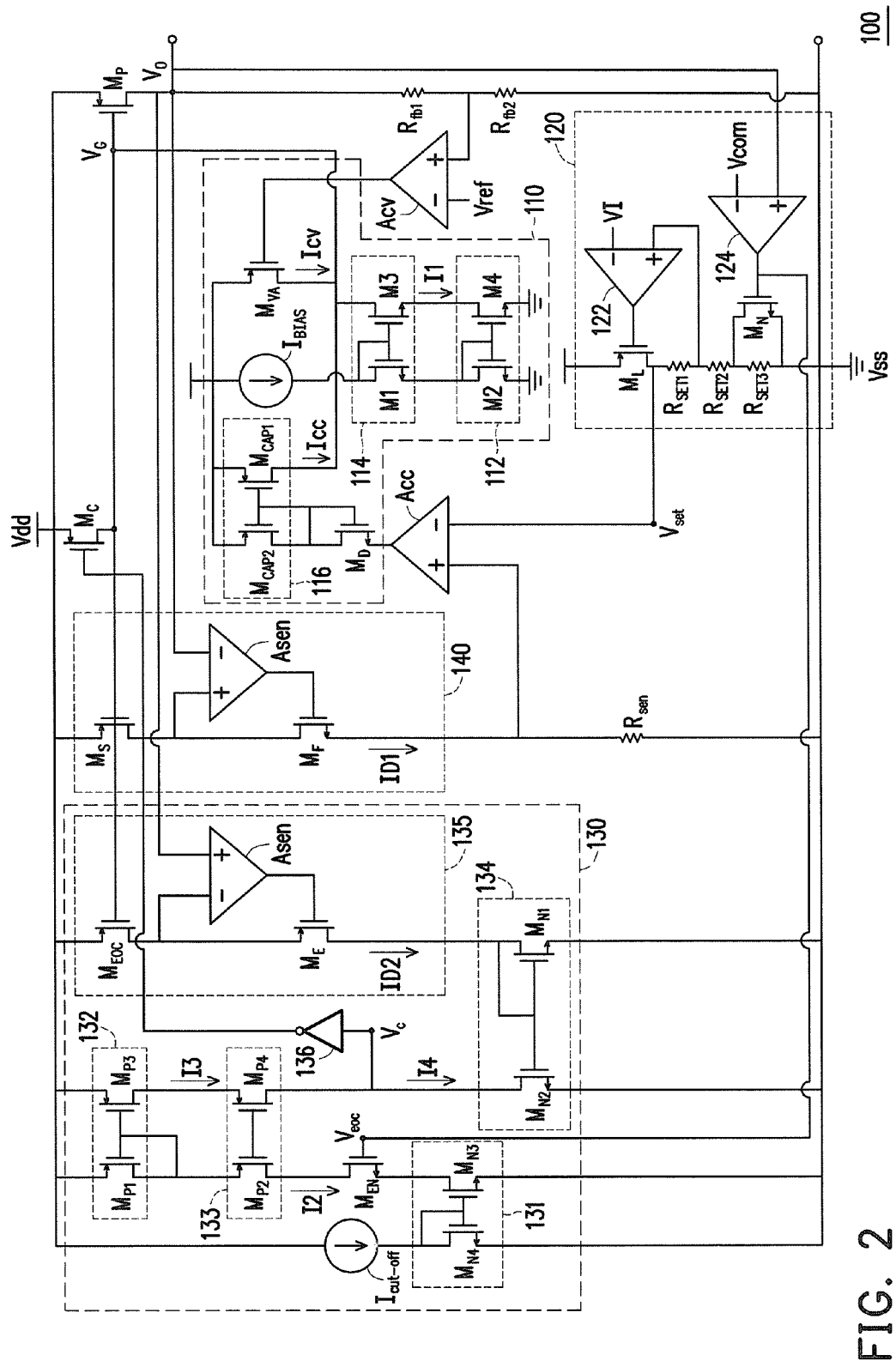
FIG. 2 is a circuit diagram illustrating a charging management device according to an embodiment of the invention.

For clarity of description, hereinafter with each elements of the charging management device 100 in FIG. 1 and FIG. 2 are used to illustrate the specific operational processes of the charging management device 100 in the invention.

FIG. 2 is a circuit diagram illustrating a charging management device according to an embodiment of the invention. Referring to FIG. 2, the charging management device 100 at least includes a power switch $M_P$, an analog smooth transition circuit (ASTC) 110, a mode selecting circuit 120, an end of charge (EOC) circuit 130, and a current sensing circuit 140, wherein the first end of the power switch $M_P$ is coupled to the system voltage Vdd, the second end of the power switch $M_P$ is coupled to the mode selecting circuit 120, EOC circuit 130, and current sensing circuit 140. The second end of the power switch $M_P$ may be the output voltage end of the charging management device 100, so as to control an output end voltage Vo for charging the rechargeable battery 102, the gate end of the power switch $M_P$ is coupled to the ASTC 110, EOC circuit 130, and current sensing circuit 140.

In an embodiment, the mode selecting circuit 120 includes a transistor $M_L$, a setting resistor $R_{SET1}$, $R_{SET2}$ and $R_{SET3}$, voltage comparators 122 and 124, and a transistor $M_N$, wherein the transistor $M_L$ takes N-type metal oxide semiconductor (NMOS) transistor as an example. The first end of the transistor $M_L$ is coupled to the system voltage Vdd, the gate end of the transistor $M_L$ is coupled to the output end of the voltage comparator 122, and the second end of the transistor $M_L$ is coupled to the output setting voltage.

As part of the setting resistors $R_{SET1}$, $R_{SET2}$ and $R_{SET3}$, the setting resistor $R_{SET1}$ has a first end and a second end, wherein the first end is coupled to the second end of the transistor $M_L$. The setting resistor $R_{SET2}$ has a first end and a second end, wherein the first end is coupled to the second end of the setting resistor $R_{SET1}$. The setting resistor $R_{SET3}$ has a first end coupled to the second end of the setting resistor $R_{SET2}$ and a second end coupled to the ground voltage Vss. In the present embodiment, the numbers of the setting resistors $R_{SET1}$, $R_{SET2}$ and $R_{SET3}$ may be changed according to the design choices, but the invention is not limited thereto.

In addition, the voltage comparator 122 of the mode selecting circuit 120 has a positive input end, a negative input end, and a output end, wherein the positive input end is coupled to the second end of the setting resistor $R_{SET1}$ and the first end of the setting resistor $R_{SET2}$, and the negative input end is coupled to the reference voltage V1 to lock the voltage of the node between the setting resistor $R_{SET1}$ and the setting resistor $R_{SET2}$. Besides, the voltage comparator 124 has a positive input end, a negative input end, and an output end, wherein the positive input end receives the output end voltage Vo, and the negative input end receives the reference voltage Vcom and the voltage comparator 124 compares the output end voltage Vo and the reference voltage Vcom and outputs the control bias $V_{eoc}$. In the present embodiment, the reference voltage is about 3V, but the invention is not limited thereto. The transistor $M_N$ of the mode selecting circuit 120 has a first end, a second end, and a gate end, wherein the first end of the transistor $M_N$ is coupled to the first end of the setting resistor $R_{SET3}$, the second end of the transistor $M_N$ is coupled to the second end of the setting resistor $R_{SET3}$, and the gate end of the transistor $M_N$ is coupled to the output end of the voltage comparator 124, wherein the transistor $M_N$ determines the conductive state according to the control bias $V_{eoc}$.

Specifically, the mode selecting circuit 120 may determine the charging mode of the charging management device 100 is TC mode or CC mode according to the voltage level of the output end voltage Vo. For example, when the output end voltage Vo is lower than the reference voltage Vcom, the voltage comparator 124 outputs a control bias $V_{eoc}$ with a low level (such as, 0V), such that the transistor $M_N$ is turned off and the current flow through the transistor $M_L$ along the flow path of the setting resistors $R_{SET1}$, $R_{SET2}$ and $R_{SET3}$, and the charging management device 100 may charge the rechargeable battery in the TC mode. When the output end voltage Vo is higher than the reference voltage Vcom, the voltage comparator 124 outputs a control voltage $V_{eoc}$ with a high level to turn on the transistor $M_N$, and the current flow through the transistor $M_L$ along the flow path of the setting resistors $R_{SET1}$ and $R_{SET2}$ and transistor $M_N$, such that the mode selecting circuit 120 outputs corresponding setting voltage Vset (such as, Vset2), and the charging management device 100 may change to the CC mode for charging the rechargeable battery.

On the other hand, whether the charging management device 100 is in TC mode or CC mode, the current sensing circuit 140 of the charging management device 10 is configured to sensing the current flow through the power switch $M_P$, so as to generate a sensing current ID1.

In an embodiment, the charging management device 100 includes a sensing resistor $R_{sen}$ and an error amplifier Acc. The sensing resistor $R_{sen}$ has a first end coupled to the current sensing circuit 140 and a second end coupled to the ground voltage Vss, and the sensing resistor $R_{sen}$ is configured to generate sensing voltage according to the sensing current ID1. The error amplifier Acc has a positive end coupled to the first end of the sensing resistor $R_{sen}$ and a negative end coupled to the mode selecting circuit 120, wherein the error amplifier Acc is configured to generate a first control bias to the analog smooth transition circuit 110, as shown in FIG. 2.

In an embodiment, the charging management device 100 further includes a dividing resistor $R_{fb1}$ and $R_{fb2}$, and an error amplifier Acv. The dividing resistor $R_{fb1}$ has a first end and a second end, wherein the first end is coupled to the output end voltage Vo. The dividing resistor $R_{fb2}$ has a first end coupled to the first end of the dividing resistor $R_{fb1}$, and a second coupled to the ground voltage Vss. The error amplifier Acv has a positive end coupled to the second end of the dividing resistor $R_{fb1}$ and the first end of the dividing resistor $R_{fb2}$, and a negative end, wherein the error amplifier Acv is configured to receive and compare the dividing voltage and the reference voltage Vref to generate the second control bias to the analog smooth transition circuit 110, as shown in FIG. 2.

Continuously referring to FIG. 2, the analog smooth transition circuit 100 of the charging management device 100 includes a bias current source $I_{BIAS}$, current mirrors 114, 112, 116, and a transistor $M_{VA}$, wherein the transistor $M_{VA}$ takes P-type metal oxide semiconductor (PMOS) transistor as an example. The bias current source $I_{BIAS}$ is configured to generate a bias current. The current mirror 114 includes transistors M1, M3, wherein the transistors M1, M3 take NMOS as an example, and the current mirror 114 is coupled to the bias current source $I_{BIAS}$ to receive the bias current and generate current I1 according to the bias current. The current mirror 112 includes transistors M2 and M4, wherein the transistors M2 and M4 take NMOS as an example. The current mirror 112 is coupled with the current mirror 114 in series. The current mirror 116 includes transistors $M_{CAP1}$ and $M_{CAP2}$, wherein the transistors $M_{CAP1}$ and $M_{CAP2}$ take PMOS as an example. The current mirror 116 is coupled to the current mirror 114 and regulates the control current $I_{CC}$ according to the first control bias generated by the error amplifier Acc. The transistor $M_{VA}$ has a first end, a second end, and a gate end. The first end of the transistor $M_{VA}$ is connected to the system voltage Vdd, and the gate end of the transistor $M_{VA}$ receives and regulates the control current $I_{CV}$ according to the second control bias generated by the error amplifier Acv.

Specifically, since the bias current source $I_{BIAS}$ generates current I1 through the current mirrors 114 and 112, and also the current I1 and the control current $I_{CC}$ and $I_{CV}$ are in the same path, such that the total current between the control current $I_{CC}$ and the control current $I_{CV}$ is latched, wherein the analog smooth transition circuit 110 may alternately adjust between the CC mode and CV mode according to the total current between the control current $I_{CC}$ and the current $I_{CV}$ (similar to a current pulling change) to ease voltage level of the gate voltage $V_G$ of the power switch $M_P$, so as to achieve a continuous output voltage function, such that it may improve the voltage level of output end and reduce the ripple voltage.

In an embodiment, the EOC circuit 130 includes a cut-off current source $I_{cut\text{-}off}$, current mirrors 131, 132, 133 and 134, a transistor $M_{EN}$, a current sensing device 135, and an inverter 136, wherein the transistor $M_{EN}$ takes NMOS as an example. The cut-off current source $I_{cut\text{-}off}$ is configured to provide reference current. The current mirror 131 of the EOC circuit 130 includes transistors $M_{N3}$ and $M_{N4}$, wherein the transistors $M_{N3}$ and $M_{N4}$ take NMOS as an example and the current mirror 131 receive the reference current to provide current I2 according to the reference current. The transistor $M_{EN}$ has a first end coupled to the current mirror 131, a second end, and a gate end coupled to the mode selecting circuit 120, wherein the transistor $M_{EN}$ determines the conductive state of the transition path of the current I2 according to the voltage level of the control bias $V_{eoc}$.

Specifically, when the voltage level of the control bias $V_{eoc}$ of the output end of the voltage comparator 124 in the mode selecting circuit 120 is low level (such as, 0V), the transistor $M_{EN}$ may be turned off, that is the transmission path of the current I2 is disconnected. When the voltage level of the control bias $V_{eoc}$ of the output end of the voltage comparator 124 in the mode selecting circuit 120 is high level, the transistor $M_{EN}$ may be turned on, that is the transmission path of the current I2 is connected.

Continuously referring to FIG. 2, the current mirror 133 of the EOC circuit 130 includes transistors $M_{P2}$ and $M_{P4}$, wherein the transistors $M_{P2}$ and $M_{P4}$ take PMOS as an example and the current mirror 133 is coupled to the second end of the transistor $M_{EN}$. The current mirror 132 of the EOC circuit 130 includes transistors $M_{P1}$ and $M_{P3}$, wherein the transistors $M_{P1}$ and $M_{P3}$ take PMOS as an example and the current mirror 132 is connected with the current mirror 133 in series. When the transistor $M_{EN}$ is turned on, the current mirror 132 is configured to receive and generate the current I3 according to the current I2 and the current mirror 133 is configured to receive and transmit the current I3, wherein the current I2 is equal to the current I3.

On the other hand, the current sensing circuit 135 of the EOC circuit 130 is configured to sense the voltage level of the positive of the rechargeable battery and to generate a sensing current ID2. The current mirror 134 of the EOC circuit 130 includes transistors $M_{N1}$ and $M_{N2}$, wherein the transistors $M_{N1}$ and $M_{N2}$ take NMOS as an example and the current mirror 134 is coupled to the current sensing circuit 135 to receive the sensing current ID2 and generate current I4 according to the sensing current ID2, wherein the sensing current ID2 is equal to the current I4. The input end of the inverter 136 of the EOC circuit 130 is coupled between the current mirror 133 and the current mirror 134 and the output end of the inverter 136 of the EOC circuit 130 is coupled to the gate end of the transistor $M_C$. Since the current I3 is a constant value and on the same way with the current I4, the voltage level of the node voltage $V_C$ between the current mirror 133 and the current mirror 134 according to the current difference between the current I3 and the current I4. On the other hand, when the current value rises up, the voltage level of the node voltage $V_C$ may drop down, in contrast, when the current value drops down, the voltage level of the node voltage $V_C$ may rise up. And then, the inverting result is outputted through the inverter 136.

In the present embodiment, the charging management device 100 further includes a transistor $M_C$ having a first end coupled to the system voltage Vdd, a second end coupled to the gate end of the power switch $M_P$, and a gate end coupled to the inverter 136 of the EOC circuit 130, which changes the conductive state according to the inverting result outputted by the inverter 136, wherein the transistor $M_C$ takes PMOS as an example. When the gate end of the transistor $M_C$ receive the inverting result with the high level, transistor $M_C$ is turned on and pull up the voltage level of the gate voltage $V_G$ of the power switch $M_P$, which causes the power switch $M_P$ is turned off and the charging current of the rechargeable battery drops down to the pre-set current value (such as, $I_{cut\text{-}off}$), such that the charging management device 100 enters to the EOC mode and stops charging action. In this way, EOC circuit 130 can accurately determine the battery is fully charged and timely close charging process to prevent the battery from overcharging, so as to achieve the purpose of protecting the lithium-ion battery charger circuit and the battery.

To sum up, the invention provides a charging structure having an analog smooth transition circuit and an end of charge circuit, on the one hand, the invention with the smooth conversion circuit switched alternately between charging modes to achieve a continuous output voltage regulator functionality, so as to ease the output voltage level and improve the ripple voltage. On the other hand, the invention with the end of charge circuit for fully rechargeable battery precisely and directly through the current sensing transistor to reduce the error in judgment, thereby it turns off the charging process more accurately. Therefore, the charging structure proposed by the invention may not damage the battery, but also lithium battery is fully charged precisely, therefore the invention significantly improves the charging quality and extends the battery life.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A charging structure comprising:
a power supply device, configured to provide a system voltage;
a rechargeable battery, connected in parallel with the power supply device; and
a charging management device, connected in parallel with the power supply device and the rechargeable battery, and configured to switch a corresponding charging mode according to a voltage level of a positive end of the rechargeable battery, wherein the charging management device stops charging action when a charging current for charging the rechargeable battery drops down to a pre-set current value, wherein the charging management device comprises:
a power switch having a first end for receiving the system voltage, and a second end coupled to the positive end of the rechargeable battery to control an output end voltage for charging the rechargeable battery; and an analog smooth transition circuit, coupled to a gate end of the power switch, configured to regulate a voltage level of the gate end of the power switch according to the output end voltage; and an end of charge circuit, coupled to the second end of the power switch, configured to sense the charging current by a second current sensing circuit, wherein the end of charge circuit stops the charging action when the charging current drops down to the pre-set current value.

2. The charging structure according to claim 1, wherein the analog smooth transition circuit comprises:
a bias current source, configured to provide a bias current;
a first current mirror coupled to the bias current source to receive the bias current and provide a first current according to the bias current;
a second current mirror coupled to the first current mirror;
a third current mirror coupled to the first current mirror to regulate a first control current according to a first control bias; and
a first transistor having a first end, a second end and a gate end, wherein the first end of the first transistor is configured to receive the system voltage, the gate end of the first transistor is configured to receive a second control bias, and the first transistor is configured to regulate a second control current according to the second control bias,
wherein a total current of the first control current and the second control current is equal to the first current, and the analog smooth transition circuit regulates a gate voltage level of the gate end of the power switch according to the total current.

3. The charging structure according to claim 1, further comprises a mode selecting circuit configured to determine a charging mode and output a setting voltage according to the output end voltage, wherein the end of charge circuit comprises:
a cut-off current source, configured to provide a reference current;
a fourth current mirror, configured to receive the reference current and provide a second current according to the reference current;
a fifth transistor having a first end, a second end and a gate end, wherein the first end of the fifth transistor is coupled to the fourth current mirror, the gate end of the fifth transistor is coupled to a mode selecting circuit, and the fifth transistor is configured to determine a conductive state of a path of the second current according to the level of the setting voltage;
a fifth current mirror, coupled to the second end of the fifth transistor, configured to receive the second current to generate a third current;
a sixth current mirror, connected in series with the fifth current mirror, configured to receive the third current;
the second current sensing circuit, configured to sense the current level of the positive end of the rechargeable battery to generate a second sensing current; and
a seventh current mirror, coupled to the second current sensing circuit, configured to receive the second sensing current and generate a fourth current according to the second sensing current,
wherein the end of charge circuit determines a node voltage of a node between the sixth current mirror and the seventh current mirror according to the current difference between the third current and the fourth current.

4. The charging structure according to claim 3, wherein the end of charge circuit further comprises:
an inverter having an input end and an output end, wherein the input end of the inverter is coupled between the sixth current mirror and the seventh current mirror, and the output end of the inverter is coupled to the charging management device, and the inverter is configured to output an inverting result according to the node voltage of the node between the sixth current mirror and the seventh current mirror.

5. The charging structure according to claim 4, wherein the charging management device further comprises:
a sixth transistor having a first end, a second end and a gate end, wherein the first end of the sixth transistor is coupled to the system voltage, the second end of the sixth transistor is coupled to the gate end of the power switch, and the gate end of the sixth transistor is coupled to the output end of the inverter of the end of charge circuit, and the sixth transistor is configured to determine the conductive state according to the inverting result.

6. The charging structure according to claim 1, further comprising:
a first current sensing circuit, coupled between the power switch and the analog smooth transition circuit, configured to sense the output end voltage of the second end of the power switch to generate a first sensing current.

7. The charging structure according to claim 6, wherein the charging management device further comprises:
a mode selecting circuit configured to determine the charging mode and output a setting voltage according to the output end voltage, wherein the mode selecting circuit comprises:
a first setting resistor having a first end coupled to a second end of a third transistor;
a second setting resistor having a first end coupled to a second end of the first setting resistor;
a third setting resistor having a first end coupled to a second end of the second setting resistor and a second end coupled to a ground voltage;
a first voltage comparator having a positive end, a negative end and a output end, wherein the positive end of the first voltage comparator is coupled to the second end of the first setting resistor and the first end of the second setting resistor, the negative end of the first voltage comparator is coupled to a third reference voltage, and the first voltage comparator is configured to compare the third reference voltage with a dividing voltage between the first setting resistor and the second setting resistor;
the third transistor having a first end, a second end and a gate end, wherein the first end of the third transistor is coupled to the system voltage, the second end of the third transistor is configured to output the setting voltage, and the gate end of the third transistor is coupled to the output end of the first voltage comparator;
a second voltage comparator having a positive end, a negative end and a output end, wherein the positive end of the second voltage comparator is coupled to the output end voltage, a negative end of the second voltage comparator is coupled to a first reference voltage, and the second voltage comparator is configured to compare the output end voltage and the first reference voltage for generating a third control bias; and a fourth transistor having a first end, a second end and a gate end, wherein the first end of the fourth transistor is coupled to the first end of the third setting resistor, a second end of the fourth transistor is coupled to the second end of the third setting resistor, and a gate end of the fourth transistor is coupled to the output end of the second voltage comparator to determine a conductive state according to the third control bias.

8. The charging structure according to claim 7, wherein the charging management device further comprises:
   a sensing resistor having a first end and a second end, wherein the first end of the sensing resistor is coupled to a current sensing circuit, the second end of the sensing resistor is coupled to a ground voltage, and the sensing resistor is configured to generate a first sensing voltage according to a first sensing current of the current sensing circuit; and
   a first error amplifier having a positive input end and a negative input end, wherein the positive input end of the first error amplifier is coupled to the first end of the sensing resistor, the negative input end of the first error amplifier is coupled to a mode selecting circuit, and the first error amplifier is configured to receive and compare the first sensing voltage and a setting voltage of the mode selecting circuit to generate a first control bias.

9. The charging structure according to claim 1, wherein the charging management device further comprises:
   a first dividing resistor having a first end and a second end, wherein the first end of the first dividing resistor is configured to receive the output end voltage;
   a second dividing resistor having a first end and a second end, wherein the first end of the second dividing resistor is coupled to the first end of the first dividing resistor, and the second end of the second dividing resistor is coupled to a ground voltage; and
   a second error amplifier having a positive input end and a negative input end, wherein the positive input end of the second error amplifier is coupled to the second end of the first dividing resistor and the first end of the second dividing resistor to receive a dividing voltage, and the negative input end of the second error amplifier is configured to receive a second reference voltage, and the second error amplifier is configured to compare the dividing voltage and the second reference voltage to generate a second control bias.

* * * * *